(12) United States Patent
Hummel

(10) Patent No.: US 10,677,323 B2
(45) Date of Patent: Jun. 9, 2020

(54) DUAL CLUTCH TRANSMISSION FOR A MOTOR VEHICLE

(71) Applicant: AUDI AG, Ingolstadt (DE)

(72) Inventor: Steffen Hummel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 461 days.

(21) Appl. No.: 15/551,952

(22) PCT Filed: Jan. 20, 2016

(86) PCT No.: PCT/EP2016/051116
§ 371 (c)(1),
(2) Date: Aug. 18, 2017

(87) PCT Pub. No.: WO2016/131599
PCT Pub. Date: Aug. 25, 2016

(65) Prior Publication Data
US 2018/0038452 A1 Feb. 8, 2018

(30) Foreign Application Priority Data
Feb. 19, 2015 (DE) .................. 10 2015 002 134

(51) Int. Cl.
*F16H 3/00* (2006.01)
*F16H 3/089* (2006.01)
*F16H 3/08* (2006.01)

(52) U.S. Cl.
CPC ............ *F16H 3/006* (2013.01); *F16H 3/089* (2013.01); *F16H 2003/0803* (2013.01);
(Continued)

(58) Field of Classification Search
CPC .. F16H 3/006; F16H 3/089; F16H 2003/0803; F16H 2003/0818; F16H 2003/0826; F16H 2200/0078
(Continued)

(56) References Cited

U.S. PATENT DOCUMENTS
2014/0013881 A1   1/2014  Luebke et al.

FOREIGN PATENT DOCUMENTS

| CN | 103398078 A | 4/2009 |
|---|---|---|
| CN | 103097769 A | 5/2013 |

(Continued)

OTHER PUBLICATIONS

Chinese Office Action dated Dec. 28, 2018, in connection with corresponding CN Application No. 201680009972.4 (10 pgs., including machine-generated English translation).
(Continued)

*Primary Examiner* — William C Joyce
(74) *Attorney, Agent, or Firm* — Maier & Maier, PLLC

(57) ABSTRACT

A dual clutch transmission for a motor vehicle, with gear wheel sets, which can be engaged via shift elements and which form exactly eight wheel planes, which are associated, respectively, with a first sub-transmission and a second sub-transmission, of which each sub-transmission has a respective input shaft and the two sub-transmissions have a common output shaft, which is axis-parallel to the input shafts. The mutually coaxial input shafts can each be activated in alternation via a power-shift clutch, and the even forward gears are associated with the first sub-transmission and the odd forward gears are associated with the second sub-transmission, which can be engaged when a gear shift occurs via the shift elements.

13 Claims, 2 Drawing Sheets

(52) U.S. Cl.
CPC ............... *F16H 2003/0818* (2013.01); *F16H 2003/0822* (2013.01); *F16H 2003/0826* (2013.01); *F16H 2200/0078* (2013.01)

(58) Field of Classification Search
USPC .......................................................... 74/330
See application file for complete search history.

(56) References Cited

FOREIGN PATENT DOCUMENTS

| | | |
|---|---|---|
| CN | 103649600 A | 3/2014 |
| CN | 103711845 A | 4/2014 |
| DE | 10 2010 040 660 A1 | 3/2012 |
| DE | 10 2011 089 167 A1 | 6/2013 |
| DE | 10 2012 013 248 A1 | 1/2014 |
| DE | 10 2012 213 704 A1 | 2/2014 |
| JP | 2014-031857 A | 2/2014 |

OTHER PUBLICATIONS

Notification of Transmittal of Translation of the International Preliminary Report on Patentability dated Aug. 24, 2017, in connection with corresponding international application No. PCT/EP2016/051116 (20 pages).

International Search Report dated May 4, 2016 of corresponding International application No. PCT/EP2016/051116; 22 pgs.

International Preliminary Report on Patentability dated Jun. 8, 2017 of corresponding International application No. PCT/EP2016/051116; 22 pgs.

Fig. 2

| G | K1 | K2 | RE-1 | RE-2 | RE-3 | RE-4 | RE-5 | RE-6 | RE-7 | RE-8 | SE-A | SE-B | SE-C | SE-D | SE-E | SE-F |
|---|---|---|---|---|---|---|---|---|---|---|---|---|---|---|---|---|
| 1 | X | | | | | | | | | | | | | | | |
| 1 | | X | X | X | | | X | | X | X | re | ≡ | | | | |
| 2 | | X | X | X | X | | X | | | | | | ≡ | re | | |
| 3 | X | X | | | | | | | | | | ≡ | ≡ | | | |
| 3 | | X | | | X | | X | | | | | | re | re | | |
| 4 | | X | | | X | | | | | | re | | re | | | |
| 5 | X | X | X | X | | | | | | | ≡ | | ≡ | | | |
| 6 | X | X | X | | | | | | X | X | ≡ | | re | | | re |
| 7 | | X | | X | | | | X | X | | | | | | ≡ | ≡ |
| 8 | X | X | | X | | | | X | X | X | re | re | ≡ | ≡ | | |
| 9 | X | X | X | X | | X | | X | | | ≡ | re | | ≡ | | |
| 10 | X | X | | | | X | | | | | | re | ≡ | | ≡ | |
| 11 | X | | | | | X | | | | | | | ≡ | ≡ | | |
| 12 | | X | | | | | | | | | | | re | ≡ | | |

DUAL CLUTCH TRANSMISSION FOR A MOTOR VEHICLE

FIELD

The present invention relates to a dual clutch transmission for a motor vehicle.

BACKGROUND

Dual clutch transmissions of this type have, besides a good efficiency, the advantage that, among other things, they can be shifted or engaged automatically, in particular, without interruption of the tractive force, wherein, in the respectively non-activated sub-transmission, a gear step can already be preselected and then activated by changing the power-shift clutches. In the process, the odd gears (1, 3, 5, etc.) in one sub-transmission and the even gears (2, 4, 6, etc.) in the other sub-transmission are positioned by means of corresponding gear wheel sets, which are in driving connection with the respective input shaft or the output shaft for example, via synchronous clutches.

The axial length of the dual clutch transmission depends on the number of gear wheel sets or wheel planes that are arranged in the dual clutch transmission in succession in the axial direction. Each of the wheel planes is made up of at least two fixed gear wheels and/or detached gear wheels. Arranged between the wheel planes are shift elements that, when actuated, enable the engagement of forward and reverse gears.

A dual clutch transmission of the generic type has gear wheel sets that can be engaged via shift elements and, in particular, form exactly eight wheel planes. The wheel planes are each associated with a first sub-transmission and a second sub-transmission. Each of the sub-transmissions has an input shaft as well as a common output shaft. The mutually coaxial input shafts can be activated in alternation via a respective power-shift clutch, wherein the even forward gears are associated with the first sub-transmission and the odd forward gears are associated with the second sub-transmission and, when a shift of gear occurs, these gears can be engaged via the shift element. In the generic dual clutch transmission, each of the wheel planes has a drive gear wheel, which is mounted detachably or torsionally resistant on the particular input shaft, and an output-side gear wheel, which is mounted detachably or torsionally resistant on the output shaft and meshes with the former gear wheel. They can be coupled to the input shaft and/or to the output shaft, or decoupled therefrom, by means of shift elements with the formation of forward gears.

SUMMARY OF THE DISCLOSURE

The object of the invention consists in providing a dual clutch transmission, which, given a design that is favorable in terms of construction, has greater degrees of freedom in terms of functionality (shifting strategy) and in terms of the design of the gear steps.

In accordance with the disclosure, the first wheel plane RE-1, which originates from the clutches K1, K2 in the direction of torque flow, and the second wheel plane RE-2 in the first sub-transmission are connected to each other via an output-side hollow shaft, which is coaxially and rotatably mounted on the output shaft, in a torsionally resistant manner Arranged on the output-side hollow shaft of the first sub-transmission in a torsionally resistant manner is both an output-side gear wheel of the first wheel plane and an output-side gear wheel of the second wheel plane. The second wheel plane RE-2 and a third wheel plane RE-3 that follows in the axial direction are connected to each other, in a torsionally resistant manner, via a drive-side hollow shaft, which is coaxially mounted rotatably on the first input shaft of the first sub-transmission. Arranged on this drive-side hollow shaft in a torsionally resistant manner are both a drive-side gear wheel of the second wheel plane and a drive-side gear wheel of the third wheel plane. It is possible with a transmission structure of this type for the three wheel planes RE-1 to RE-3 to present a total of four forward gears in a manner that is simple in terms of clutch engineering and, in fact, to present three direct forward gears, each of which makes use of one of the three wheel planes RE-1 to RE-3, and a twist forward gear, which makes use of the three wheel planes in combination.

In a preferred variant in terms of clutch engineering, the output-side hollow shaft of the first sub-transmission can be coupled via a first shift element SE-F to the output shaft. The first shift element can be borne by the output shaft. In regard to a compact transmission structure, the first shift element SE-F can lie in alignment opposite the drive-side hollow shaft in the radial direction.

In contrast to this, the drive-side hollow shaft of the first sub-transmission can be coupled via a second shift element to the first input shaft. The second shift element can be borne by the first input shaft. In regard to a compact transmission structure, the second shift element can lie in alignment opposite the output-side hollow shaft as viewed in the radial direction.

The second sub-transmission can, similarly to the first sub-transmission, likewise have an output-side hollow shaft and a drive-side hollow shaft. In this case, the two output-side gear wheels of two wheel planes of the second sub-transmission (in particular, the seventh and eighth wheel planes) can be arranged in a torsionally resistant manner on an output-side hollow shaft, which is coaxially and rotatably mounted on the output shaft. The second sub-transmission can have a further, in particular sixth wheel plane RE-6, which is arranged on the side of the two wheel planes facing the clutches K1, K2. The additional wheel plane RE-6 can be connected in a torsionally resistant manner to the wheel plane RE-7, which follows in the axial direction, via another drive-side hollow shaft, which is coaxially and rotatably mounted on the second input shaft of the second sub-transmission. It is possible to arrange, in a torsionally resistant manner, on the drive-side hollow shaft of the second sub-transmission, both a drive-side gear wheel of the seventh wheel plane and a drive-side gear wheel of the further (sixth) wheel plane in a detached, rotatable manner. The drive-side gear wheel of the sixth wheel plane, detachably and rotatably mounted on the drive-side hollow shaft, can be coupled by means of a later-described sixth shift element SE-B to the drive-side hollow shaft of the second sub-transmission.

In a technical implementation, the above second shift element SE-C can be a shift element that can be engaged on both sides in the axial direction. In this case, the second shift element SE-C can be arranged in the axial direction between the two drive-side gear wheels of the two wheel planes RE-1 and RE-2 and can be borne by the input shaft.

Preferably, the two wheel planes RE-1 and RE-2 are the first and second wheel planes in the first sub-transmission of the dual clutch transmission in the direction of torque flow. The first sub-transmission can have, in addition, a third wheel plane that has a drive-side gear wheel, which is detachably and rotatably mounted on the input shaft, and has an output-side gear wheel, which is detachably and rotatably mounted on the output shaft and meshes with the former gear wheel. The output-side gear wheel of the third wheel plane RE-3 can be coupled by means of the first shift element to the output shaft. In this case, the first shift element SE-F can be realized as a shift element that can be engaged on both sides in the axial direction and is arranged between the two output-side gear wheels of the second and third wheel planes.

The drive-side gear wheel of the third wheel plane can be arranged together with the drive-side gear wheel of the second wheel plane in a torsionally resistant manner on a drive-side hollow shaft, which is coaxially and rotatably mounted on the first input shaft.

In addition, the first sub-transmission can have a fourth wheel plane, which has an output-side gear wheel, which is arranged on the output shaft in a torsionally resistant manner, and a drive-side gear wheel, which is detachably and rotatably mounted on the drive-side hollow shaft and meshes with the former gear wheel. The drive-side gear wheel of the fourth wheel plane RE-4 can be coupled by a third shift element SE-D to the drive-side hollow shaft of the first sub-transmission.

In an enhancement of the invention, the second sub-transmission can have a fifth wheel plane RE-5, which has a drive-side gear wheel, which is detachably and rotatably mounted on the second input shaft, and an output-side gear wheel, which is detachably and rotatably mounted on the output shaft. In a preferred implementation variant, the fifth wheel plane RE-5 can be engagable not only on the second sub-transmission, but also on the first sub-transmission.

The drive-side gear wheel of the fifth wheel plane can be coupled by means of the above-mentioned third shift element SE-D to the drive-side hollow shaft of the first sub-transmission. In this case, the third shift element SE-D is a shift element that can be engaged on both sides in the axial direction and is borne in the axial direction between the fourth wheel plane RE-4 and the fifth wheel plane RE-5 by the drive-side hollow shaft of the first sub-transmission.

The output-side gear wheel of the fifth wheel plane RE-5 can be coupled via an additional fourth shift element SE-G to the output shaft.

The two drive-side gear wheels of the two wheel planes can be coupled via exactly one fifth shift element SE-A in alternation to the second input shaft of the second sub-transmission. In this case, the fifth shift element can be arranged in the axial direction between the two drive-side gear wheels of the two wheel planes RE-7 and RE-8 and can be designed as a shift element that can be engaged on both sides.

Between the fifth wheel plane and the sixth wheel plane, it is possible to arrange an additional sixth shift element SE-B, which is a shift element acting on both sides in the axial direction. The sixth shift element SE-B can couple either the drive-side gear wheel of the fifth wheel plane RE-5 or the drive-side gear wheel of the sixth wheel plane RE-6 to the drive-side hollow shaft of the second sub-transmission.

As mentioned above, at least one gear wheel set, that is, the fifth wheel plane, of the one sub-transmission can be coupled via a shift element to the other sub-transmission. As a result of this, it is possible with little added expense and effort in terms of transmission engineering and without dispensing with the advantage of acceleration of the motor vehicle without interruption of the tractive force to skip at least one forward gear, that is, for example, to shift from an odd forward gear to the next odd forward gear without any delay. In particular in the case of strong motorizations of the motor vehicle and for defined driving conditions, this can enable an improved acceleration, occurring without any shifting delays, and, under circumstances, an improved efficiency in drive operation.

Especially preferably, the gear wheel set can form at least the 3rd forward gear of the sub-transmission, which can be connected in driving operation indirectly or directly optionally to the input shaft of the one or the other sub-transmission A, B. Resulting from this, besides the normal shifting strategy, is a variant in which it is possible to shift from the 1st gear to the 3rd gear and, as needed, from the latter to the 5th gear without interruption of the tractive force.

If, in the case of a corresponding gearing of said gear wheel set, said gear wheel set is also incorporated into the flow of power of the 1st forward gear, then, here, too, it is possible to switch the sub-transmission, as a result of which an additional degree of freedom in terms of functionality is created. then, here, too, it is possible to switch the sub-transmission, as a result of which an additional degree of freedom in terms of functionality is created.

In a preferred embodiment of the invention, the fixed gear wheel of the gear wheel set that can be engaged on the two sub-transmissions can be arranged on the common output shaft of the speed-change transmission, while the corresponding, engageable detached gear wheel can be coupled in a simple manner in terms of control engineering to the shift element SE-D of the sub-transmission A or to the shift element SE-B of the sub-transmission B. In this case, the shift elements can be dual clutches, by means of which a gear wheel set of the one sub-transmission or the gear wheel set of the other sub-transmission can be engaged.

In an advantageous enhancement of the invention, it is possible in the case of a 12-gear transmission to use only eight wheel planes by multiply using the gear wheel sets, wherein the commonly used gear wheel set of the one sub-transmission is arranged directly adjacent to the other sub-transmission. The speed-change transmission can accordingly be relatively short in construction and can be designed with the least possible number of shift elements and gear selectors.

Furthermore, it is possible to this end to fasten fixed gear wheels of a plurality of gear wheel or wheel planes of the two sub-transmissions on respectively common hollow shafts and for these to be mounted rotatably on the common output shaft as well as via shifting clutches (that is, shift elements) to the output shaft.

Additional fixed gear wheels of the wheel planes can further be arranged on a hollow shaft, which is mounted on the input shaft of the one sub-transmission and which can be coupled by means of a shifting clutch to said gear wheel set of the other sub-transmission.

Finally, it is possible with the least possible expense and effort in terms of transmission engineering to enable the twelve forward gears to be shifted by means of five dual clutches and a single clutch, wherein four dual clutches are positioned on the coaxially arranged two input shafts of the sub-transmissions and one dual clutch as well as a single clutch are arranged on the common output shaft.

BRIEF DESCRIPTION OF THE DRAWINGS

An exemplary embodiment of the invention is described below in detail on the basis of the appended drawing. Shown are:

FIG. 2 a shift matrix of the speed-change transmission in accordance with FIG. 1.

DETAILED DESCRIPTION

Figure 1:
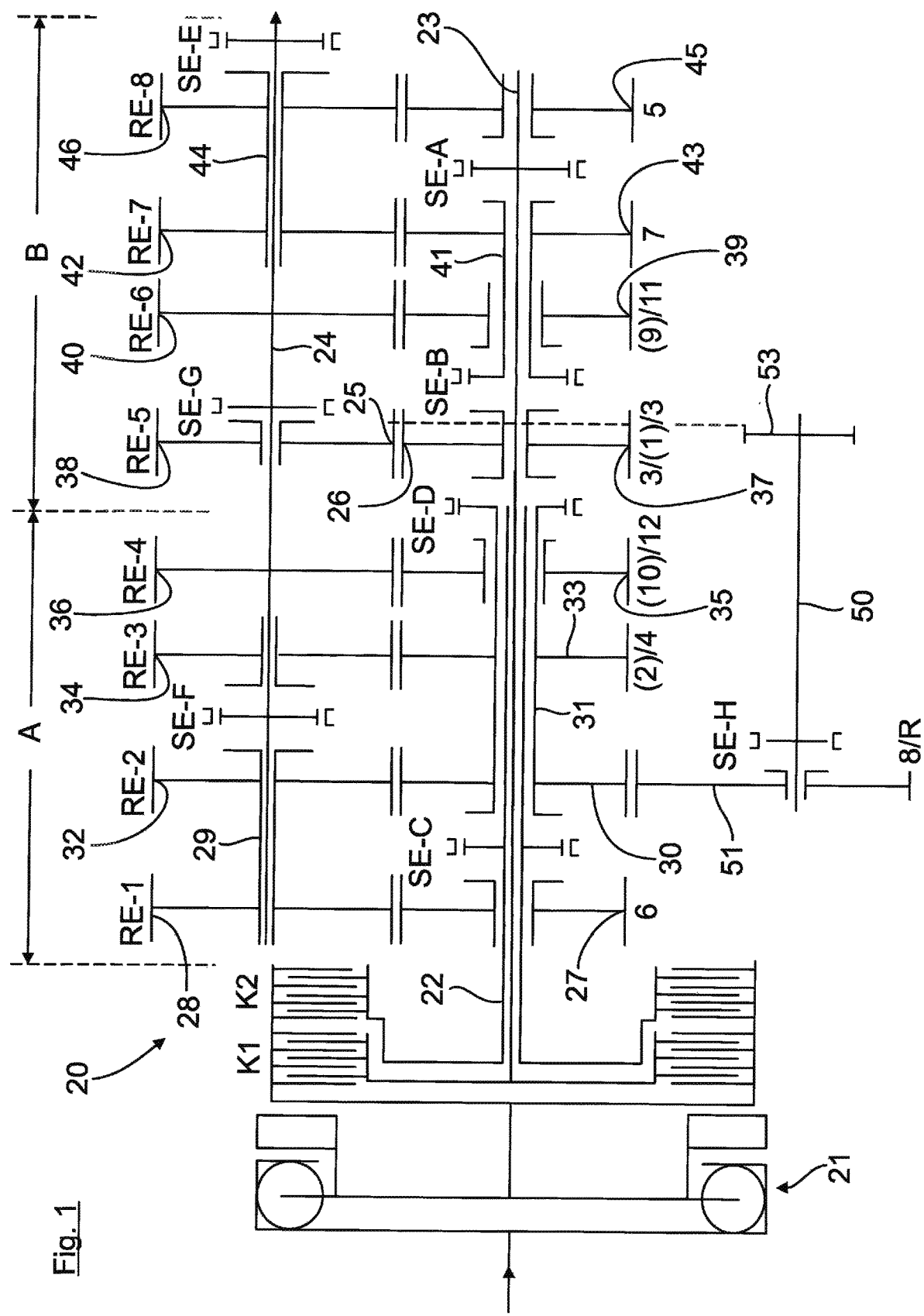
FIG. 1 as block connection diagram, a speed-change transmission for motor vehicles with two sub-transmissions, which can be activated via two power-shift clutches and which have 12 engageable forward gears, wherein a gear wheel set of the transmission can be used for both sub-transmissions.

The FIG. 1 shows a speed-change transmission or a dual clutch transmission 20 for a motor vehicle, by means of which up to twelve forward gears or, with eight gear wheel sets RE-1 to RE-8, up to twelve forward gears 1 to 12 can be engaged. Each of the wheel planes RE-1 to RE-8 is formed from a drive-side gear wheel coaxial to the input shaft 22, 23 and an output-side gear wheel coaxial to the output shaft 24.

The speed-change transmission 20 has two input shafts 22, 23, which are in driving connection with, for example, an internal combustion engine (not illustrated) and a torsional vibration damper 21 and can be coupled via two power-shift clutches K1, K2, the input shaft 22 of which is a hollow shaft, through which the second input shaft 23 passes. The rotary bearing and the corresponding transmission housing are not illustrated.

The gear wheel sets or wheel planes RE-1 to RE-8 are arranged in a way that is known as such by way of engageable detached gear wheels and by way of fixed gear wheels on the input shafts 22, 23 and on a common output shaft 24 in a way that remains to be described, wherein the gear wheel sets RE-1 to RE-4 form a first sub-transmission A and the gear wheel sets RE-5 to RE-8 form a second sub-transmission B.

The gear wheel set RE-5 of the sub-transmission B is arranged with a loose gear wheel 38 on the output shaft 24 and with an engageable detached gear wheel 26 on the input shaft 23 axially directly adjacent to the sub-transmission A in such a way that the detached gear wheel 27 thereof can be coupled via a shifting clutch SE-D either to the sub-transmission A or via a shifting clutch SE-B to the sub-transmission B.

The arrangement of the other gear wheel sets is such that the 12 forward gears can be realized for only eight gear wheel sets RE-1 to RE-8, wherein:
the detached gear wheel 27 of RE-1 is arranged on the input shaft 22 and the fixed gear wheel 28 thereof is arranged on a hollow shaft 29, which is coaxially mounted with respect to the output shaft 24, in a torsionally resistant manner;
a fixed gear wheel 30 of RE-2 is mounted via a hollow shaft 31 on the input shaft 22 and the corresponding fixed gear wheel 32 is also arranged on the hollow shaft 29 in a torsionally resistant manner;
the detached gear wheel 27 and the hollow shaft 31 can be coupled by means of a shifting clutch SE-C in alternation to the input shaft 22;
a fixed gear wheel 33 of RE-3 is arranged on the hollow shaft 31, while the detached gear wheel 34 thereof or the hollow shaft 29 can be coupled in alternation via a shifting clutch SE-F to the output shaft 24;
further mounted on the hollow shaft 31 is a detached gear wheel 35 of the gear wheel set RE-4, which meshes with a fixed gear wheel 36 on the output shaft 24;
directly axially adjacent to the detached gear wheel 35 of the gear wheel set RE-4, the detached gear wheel 37 of the gear wheel set RE-5 is mounted on the central input shaft 23 of the sub-transmission B, which engages with the further loose gear wheel 38 on the output shaft 24;
the two detached gear wheels 35, 37 can be coupled via a further shifting clutch SE-D in alternation to the hollow shaft 31 on the input shaft 22;
in addition, the detached gear wheel 37 can be coupled via a second shifting clutch SE-B to a hollow shaft 41, which is mounted on the input shaft 23, wherein the hollow shaft 41 bears a detached gear wheel 39 of the gear wheel set RE-6, which likewise can be coupled via the shifting clutch SE-B to the hollow shaft 41;
the detached gear wheel 39 of the gear wheel set RE-6 meshes with a further fixed gear wheel 40 on the output shaft 24;
the hollow shaft 41 further has a fixed gear wheel 43 of the gear wheel set RE-7, which engages with a fixed gear wheel 42 on a hollow shaft 44, which is mounted rotatably on the output shaft 24;
the hollow shaft 41 on the input shaft 23 can further be connected via a shifting clutch SE-A to the input shaft 23, wherein the shifting clutch SE-A also couples a detached gear wheel 45 of the gear wheel set RE-8 in alternation to the input shaft 23;
the fixed gear wheel 46 of the gear wheel set RE-8 is arranged, in analogy to the fixed gear wheel 42 of the [gear wheel set] RE-7, on the hollow shaft 44, wherein the hollow shaft 44 can be connected via a single shifting clutch SE-E to the output shaft 24.

The shifting clutches SE-C, SE-F, SE-D, SE-B, and SE-A can be designed as known dual synchronous clutches (with a positioning of the control sleeves thereof in the drawing of FIG. 1 to the left (li) or to the right (re) and the shifting clutch SE-E as a single synchronous clutch (shifting position li), which are conventional in shifting transmissions and are shifted from a neutral position (as drawn) under electronic control via corresponding electrically/hydraulically operated actuators.

The clutches K1, K2 can be hydraulically power-shifted plate clutches, which, in alternation, operate the sub-transmission A or B after corresponding preselection of the gears in the flow of driving force.

The forward gears 1 to 12 (a possibly required reverse gear is not drawn for simplicity) can be engaged in accordance with the shift matrix in FIG. 2, wherein the respectively shifted gear (G) 1 to 12 is given in the left column of the matrix. The crosses (X) identify the gear wheel sets RE1 to RE8 incorporated in the respective power flow and the indication (li, left) or (re, right) gives the shifting position of the respective shifting clutches SE. It is to be noted that the gears 1 and 3 in the column G are given twice, because they can be engaged optionally via the sub-transmission B (clutch K1) or the sub-transmission A (clutch K2).

In accordance therewith, the normal shifting sequence can be 1-2-3-4-5 ff., wherein the 1st gear is engaged via the clutch K1 (sub-transmission B) and the further gears are engaged through closing of the clutches K2, K1, K2, etc. in alternation. In the sub-transmission with the open clutch, it is possible, as is known, to preselect the next gear, as a result of which, through shifting of the clutches K1, K2, it is possible to shift without interrupting the traction force.

In the modified shifting sequence, the 2nd gear and, under circumstances, also the 4th gear are skipped without interruption of the tractive force, wherein the flow of force in the 1st gear is controlled via the clutch K1 or K2 (sub-transmission A or B) with corresponding incorporation of the gear wheel sets RE-1 to RE-8 and positioning of the shifting clutch SE (see matrix). It results from this that respectively the 3rd gear and, under circumstances, the 5th gear are already preselected and can be activated by switching the power-shift clutch without interruption of the tractive force.

Accordingly, it is possible to control, besides the normal shifting sequence of the dual clutch transmission 20, the modified shifting sequences 1-3-4-5-6 ff. in the order K2, K1, K2, K1, K2 ff. or 1-3-5-6, ff. in the order K1, K2, K1, K2 ff., wherein the shifting sequences can be predetermined via an electronic transmission control and/or can be adjusted manually depending on the operating data and driving parameters of the motor vehicle.

As ensues from the shift matrix of FIG. 2, the forward gears 3 to 8 as well as 11 and 12 are geared as direct gears, which, respectively, have exactly one engaged wheel plane in the flow of torque. In contrast to this, the forward gears 1, 2 and 9 as well as 10 are realized not as direct gears, but rather as twist gears, in which, by means of the shift elements SE-A to SE-G respectively exactly three wheel planes, combined in series, are engaged in the flow of torque. By way of example, in the first forward gear (twist gear) the eighth, seventh, and fifth wheel planes RE-8, RE-7, and RE-5 are engaged in the flow of torque. In the 2nd forward gear (twist gear), the first, second, and third wheel planes RE-1, RE-2, RE-3 are engaged in the flow of torque. In the ninth forward gear (twist gear), the eighth, seventh, and sixth wheel planes RE-8, RE-7, RE-6 are engaged. When the 10th forward gear (twist gear) is engaged, the first, second, and fourth wheel planes RE-1, RE-2, and RE-4 are engaged.

For provision of the respective twist forward gears 1, 2, and 9 as well as 10, the three wheel planes to be engaged are associated either completely with the first sub-transmission A or completely with the second sub-transmission B. This means that, in the case of an engaged twist forward gear, only the sub-transmission having the three twist wheel planes is incorporated in the flow of torque of the engaged gear, whereas the other sub-transmission is decoupled in full from the flow of torque.

For formation of a reverse gear R, a reverse gear shaft 50, which bridges the two sub-transmissions A, B, is mounted in the transmission housing (not illustrated) of the dual clutch transmission axis-parallel to the input shafts 22, 23 and to the output shaft 24. The reverse gear shaft 50 bears two reversing gears 51, 53, the first reversing gear 51 of which meshes with the drive-side gear 30 of the second wheel plane RE-2 and the second reversing gear 53 meshes with the drive-side gear 37 of the fifth wheel plane RE-5.

The reverse gear 51, which interacts with the second wheel plane RE-2 of the sub-transmission A is designed as a detached gear wheel and can be coupled by means of a shift element SE-H, which can be engaged at one end, to the reverse gear shaft 50. The reverse gear wheel 53, which interacts with the fifth wheel plane RE-5 is designed, by contrast, as a fixed gear wheel.

The reverse gear R is activated by shifting the shift element borne by the first input shaft 22 in of FIG. 1 to the left on the drive-side toothed gear 30 of the first wheel plane RE-1. In addition, the shift element SE-H is shifted to the left on the first reversing gear 51 and the output-side gear 38 of the intermediate wheel plane RE-5 is coupled via the shift element SE-G to the output shaft 24. Therefore, the reverse gear R is a twist gear, wherein, when the separating clutch K2 is closed, the flow of torque passes via the hollow input shaft 22 and the drive-side gear 30 of the second wheel plane RE-2 to the first reversing gear 51 and further, via the reverse gear shaft 50 as well as the second reversing gear 53, to the output-side gear 38 of the intermediate wheel plane RE-5.

The invention claimed is:

1. A dual clutch transmission for a motor vehicle, comprising:
   gear wheel sets, which can be engaged via first to seventh shift elements and which form exactly eight wheel planes, arranged in succession in the sequence first to eighth in the axial direction from an input side to an output side of the dual clutch transmission, said wheel planes being associated, respectively, with a first sub-transmission and a second sub-transmission, the first sub-transmission of which has a first input shaft and the second sub-transmission has a second input shaft, the first input shaft and the second input shaft being mutually coaxial, and the two sub-transmissions have a common output shaft that is axis-parallel to the input shafts, wherein the mutually coaxial input shafts can each be activated in alternation via a power-shift clutch, and at least some of the even forward speeds are associated with the first sub-transmission and at least some of the odd forward gears are associated with the second sub-transmission, which can be engaged when a gear shift occurs via the shift elements, wherein each of the wheel planes has a drive gear wheel, which is mounted detachably or in a torsionally resistant manner on the particular input shaft, and an output-side gear wheel, which is mounted detachably or in a torsionally resistant manner on the output shaft and meshes with the former gear wheel, which can be coupled to the particular input shaft and to the output shaft, or decoupled therefrom, by the shift elements with the formation of forward gears, wherein the first wheel plane and the second wheel plane in the first sub-transmission are joined together in a torsionally resistant manner by way of an output-side hollow shaft of the first sub-transmission, which is mounted coaxially and rotatably on the output shaft, and wherein both an output-side gear wheel of the first wheel plane as well as an output-side gear wheel of the second wheel plane are arranged in a torsionally resistant manner on the output-side hollow shaft of the first sub-transmission, and wherein the second wheel plane and a third wheel plane that follows in the axial direction are joined together in a torsionally resistant manner by way of a drive-side hollow shaft of the first sub-transmission, which is mounted coaxially and rotatably on the first input shaft, wherein a drive-side gear wheel of the second wheel plane as well as a drive-side gear wheel of the third wheel plane are arranged in a torsionally resistant manner on the drive-side hollow shaft, wherein the first sub-transmission has a fourth wheel plane, which has an output-side gear wheel arranged in a torsionally resistant manner on the output shaft and a drive-side gear wheel mounted detachably and rotatably on the drive-side hollow shaft of the first sub-transmission and meshes with the former gear wheel, and the drive-side gear wheel of the fourth wheel plane can be coupled to the drive-side hollow shaft of the first sub-transmission by a-the third shift element.

2. The dual clutch transmission according to claim 1, wherein the output-side hollow shaft of the first sub-transmission can be coupled to the output shaft by way of the first shift element, and the first shift element is borne by the output shaft and lies transverse to the axial direction, in the radial direction, opposite in alignment to the drive-side hollow shaft.

3. The dual clutch transmission according to claim 1, wherein the drive-side hollow shaft of the first sub-transmission can be coupled to the first input shaft by way of the second shift element, and the second shift element is borne by the first input shaft and lies transverse to the axial direction, in the radial direction, opposite in alignment to the output-side hollow shaft.

4. The dual clutch transmission according to claim 1, wherein the second shift element is a shift element that can be engaged on both sides in the axial direction, and the second shift element is arranged in the axial direction between the two drive-side gear wheels of the first and second wheel planes, and is borne by the first input shaft.

5. The dual clutch transmission according to claim 4, wherein the third wheel plane of the first sub-transmission has an output-side gear wheel, which is detachably and rotatably mounted on the output shaft and meshes with the drive-side gear wheel, which is detachably and rotatably mounted on the first input shaft.

6. The dual clutch transmission according to claim 5, wherein the output-side gear wheel of the third wheel plane can be coupled to the output shaft by the first shift element, and the first shift element is arranged as a shift element that can be engaged on both sides in axial direction between the two output-side gear wheels of the second and third wheel planes.

7. The dual clutch transmission according to claim 5, wherein the drive-side gear wheel of the third wheel plane is arranged, together with the drive-side gear wheel of the second wheel plane, in a torsionally resistant manner, on the drive-side hollow shaft of the first sub-transmission, which is coaxially and rotatably mounted on the first input shaft.

8. The dual clutch transmission according to claim 1, wherein the second sub-transmission has a fifth wheel plane, which has a drive-side gear wheel, which is detachably and rotatably mounted on the second input shaft, and an output-side gear wheel, which is detachably and rotatably mounted on the output shaft.

9. The dual clutch transmission according to claim 8, wherein the drive-side gear wheel of the fifth wheel plane can be coupled to the drive-side hollow shaft of the first sub-transmission by the third shift element, and the third shift element is a shift element that can be engaged on both sides in the axial direction and is borne in the axial direction between the fourth wheel plane and the fifth wheel plane by the hollow shaft of the first sub-transmission.

10. The dual clutch transmission according to claim 8, wherein the output-side gear wheel of the fifth wheel plane can be coupled to the output shaft via a fourth shift element.

11. The dual clutch transmission according to claim 1, wherein the second sub-transmission has seventh and eighth wheel planes, and the two output-side gear wheels of the seventh and eighth wheel planes are arranged, in a torsionally resistant manner, on an output-side hollow shaft of the second sub-transmission, which is coaxially and rotatably mounted on the output shaft, and the second sub-transmission has a sixth wheel plane, which, together with the seventh wheel plane, which follows in the axial direction, can be coupled, in a torsionally resistant manner, via a drive-side hollow shaft of the second sub-transmission, which is coaxially and rotatably mounted on the second input shaft, and on which both a drive-side gear wheel of the seventh wheel plane is arranged in a torsionally resistant manner, and a drive-side gear wheel of the sixth wheel plane is detachably and rotatably mounted.

12. The dual clutch transmission according to claim 11, wherein the two drive-side gear wheels of the seventh and eighth wheel planes can be coupled in alternation to the input shaft of the second sub-transmission by only the fifth shift element, and the fifth shift element is borne in the axial direction between the two drive-side gear wheels of the seventh and eighth wheel planes by the second input shaft and is designed as a shift element that can be engaged on both sides.

13. The dual clutch transmission according to claim 11, wherein, between the fifth wheel plane and the sixth wheel plane, the sixth shift element is arranged, which is a shift element that acts on both sides in the axial direction and by the shift element, either the drive-side gear wheel of the fifth wheel plane or the drive-side gear wheel of the sixth wheel plane can be coupled to the drive-side hollow shaft of the second sub-transmission.

\* \* \* \* \*